(12) United States Patent
Hu et al.

(10) Patent No.: US 10,778,537 B1
(45) Date of Patent: Sep. 15, 2020

(54) PRESENTING DEVICES FROM AN AGGREGATED NODE WITHIN A NETWORK TOPOLOGY

(71) Applicant: Cisco Technology, Inc., San Jose, CA (US)

(72) Inventors: Yongmei Hu, Los Altos, CA (US); Ryder S. Booth, Mountain View, CA (US); Shyam Srinivasan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/366,227

(22) Filed: Mar. 27, 2019

Related U.S. Application Data

(60) Provisional application No. 62/807,602, filed on Feb. 19, 2019.

(51) Int. Cl.
*G06F 3/0482* (2013.01)
*H04L 12/24* (2006.01)
*H04L 12/26* (2006.01)

(52) U.S. Cl.
CPC .............. *H04L 41/22* (2013.01); *H04L 41/12* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 5,049,873 A | * | 9/1991 | Robins | H04L 45/02 340/2.1 |
| 5,276,789 A | * | 1/1994 | Besaw | G06F 30/18 345/440 |
| 5,909,217 A | * | 6/1999 | Bereiter | G06F 3/0489 345/440 |
| 6,040,834 A | * | 3/2000 | Jain | H04L 41/06 709/223 |
| 6,456,306 B1 | * | 9/2002 | Chin | H04L 41/0213 709/224 |

(Continued)

OTHER PUBLICATIONS

User Guide for Cisco Security Manager 4.5, Apr. 25, 2017, 35 pages (Year: 2017).*

*Primary Examiner* — Yongjia Pan
(74) *Attorney, Agent, or Firm* — Merchant & Gould P.C.

(57) ABSTRACT

A method is disclosed for presenting, in a computer-generated graphical user interface, a network topology map of a plurality of nodes and data links. The plurality of nodes includes at least one aggregated node that represents multiple devices of a data communication network. Each of the data links represents a physical connection between devices represented by nodes. Detecting a selection of a first aggregated node and in response to detecting the selection, causing presentation of an expanded view comprising a list of the multiple devices of the first aggregated node. Detecting a selection of a first device of the multiple devices and presenting an updated network topology map comprising the plurality of nodes including the first aggregated node, the plurality of data links, and a first device node that represents the first device. The first aggregated node representing remaining devices of the two or more devices other than the first device.

20 Claims, 7 Drawing Sheets

(56) References Cited

U.S. PATENT DOCUMENTS

| | | | | |
|---|---|---|---|---|
| 7,310,774 B1* | 12/2007 | Arquie | H04L 41/12 | 715/734 |
| 7,315,985 B1* | 1/2008 | Gauvin | H04L 41/12 | 715/734 |
| 7,587,685 B2* | 9/2009 | Wallace | G06T 11/206 | 715/851 |
| 7,885,206 B2* | 2/2011 | Sapsford | H04L 41/22 | 370/254 |
| 8,352,620 B2* | 1/2013 | Conrad | H04L 12/6418 | 707/755 |
| 8,806,372 B2* | 8/2014 | Porter | H04L 41/22 | 715/730 |
| 2002/0054169 A1* | 5/2002 | Richardson | H04L 41/0893 | 715/854 |
| 2003/0035380 A1* | 2/2003 | Downing | H04L 41/22 | 370/255 |
| 2005/0007383 A1* | 1/2005 | Potter | G06F 9/451 | 345/619 |
| 2006/0048075 A1* | 3/2006 | Kim | G06F 3/0482 | 715/840 |
| 2006/0174200 A1* | 8/2006 | Boyles | G06F 16/954 | 715/734 |
| 2007/0113185 A1* | 5/2007 | MacLeod | H04L 41/22 | 715/734 |
| 2007/0240051 A1* | 10/2007 | Sherrill | G05B 23/0267 | 715/700 |
| 2009/0013281 A1* | 1/2009 | Helfman | G06Q 10/10 | 715/788 |
| 2009/0092113 A1* | 4/2009 | Doshi | H04W 24/04 | 370/338 |
| 2010/0180230 A1* | 7/2010 | Bogner | G06F 3/0481 | 715/810 |
| 2013/0346857 A1* | 12/2013 | Zhang | H04L 41/12 | 715/711 |
| 2016/0239185 A1* | 8/2016 | Balimidi | G06F 3/0482 | |

* cited by examiner

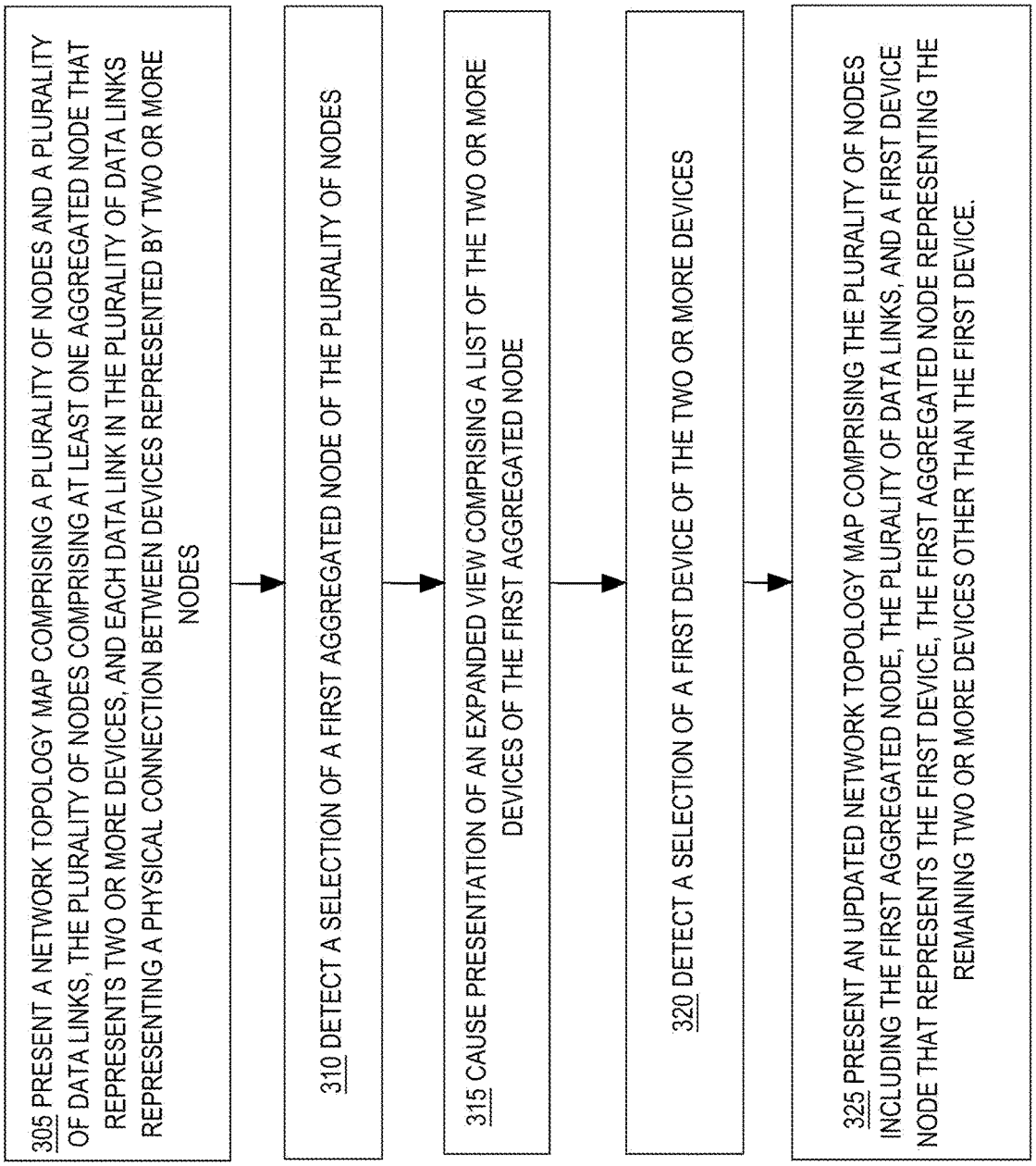

PRESENTING DEVICES FROM AN AGGREGATED NODE WITHIN A NETWORK TOPOLOGY

CROSS-REFERENCE TO BENEFIT CLAIM

This application claims the benefit of Provisional Appln. 62/807,602, filed Feb. 19, 2019, the entire contents of which is hereby incorporated by reference as if fully set forth herein, under 35 U.S.C. § 119(e)

TECHNICAL FIELD

The present disclosure relates generally to computer-implemented systems and methods for generating and presenting visual displays of a network topology of computing and network resources of data communications networks, in a computer-generated graphical user interface.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A network topology is a view of the structure of network resources that shows logical and/or physical arrangements and connections between network elements. The network topology may be depicted in a network topology map with nodes that represent network infrastructure elements or endpoints, and edges or links which represent physical network connections between elements. However, as the network grows, the number of nodes and the number of links increase, creating challenges for presenting the network topology map in a single site view of the computer-generated graphical user interface.

To accommodate space for new network elements, existing topology approaches typically depict nodes in smaller sizes and/or show links more densely in the network topology map, making it difficult to read or digest the connections and routes between the nodes. Further, existing topology display techniques may produce topology maps that leave less space for identifiers of the nodes and links which can cause errors when trying to identify specific elements that may have failures of other errors.

BRIEF DESCRIPTION OF THE DRAWINGS

In the drawings:

FIG. 3 illustrates a method or algorithm for presenting a network topology map of network of devices, receiving input to selectively display a device represented by an aggregated node as a separate node, and generating an updated network topology map that includes the separate node, according to various embodiments.

DESCRIPTION OF EXAMPLE EMBODIMENTS

Presenting individual devices from an aggregated item is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 OVERVIEW
  2.0 STRUCTURAL OVERVIEW
  3.0 PROCEDURAL OVERVIEW
    3.1 NETWORK TOPOLOGY MAP
    3.2 VIEW OF DEVICES REPRESENTED BY AN AGGREGATED NODE
    3.3 UPDATING NETWORK TOPOLOGY MAP
    3.4 SUMMARY VIEW OF DEVICE WITHIN AGGREGATED NODE
  4.0 IMPLEMENTATION MECHANISMS—HARDWARE OVERVIEW
  5.0 BENEFITS, IMPROVEMENTS, EXTENSIONS AND ALTERNATIVES

1.0 Overview

Techniques for presenting individual devices from an aggregated node are described. In an embodiment, a network topology map that includes a plurality of nodes and a plurality of data links are presented within a computer-generated graphical user interface. The plurality of nodes may include at least one aggregated node that represents two or more devices of a data communication network. Each of the data links in the plurality of data links represent a physical connection between devices represented by two or more nodes. A selection of a first aggregated node of the plurality of nodes may be detected. In response to detecting the selection of the first aggregated node, an expanded view of the two or more devices that are represented by the first aggregated node may be presented within the computer-generated graphical user interface. A selection of a first device, of the two or more devices, may be detected. In response to detecting the selection, an updated network topology map may be presented within the computer-generated graphical user interface. The updated network topology map includes the plurality of nodes, which includes the first aggregated node, the plurality of data links, and a first device node that represents the first device. The first aggregated node representing the remaining devices of the two or more devices other than the first device selected.

2.0 Structural Overview

Figure 1:
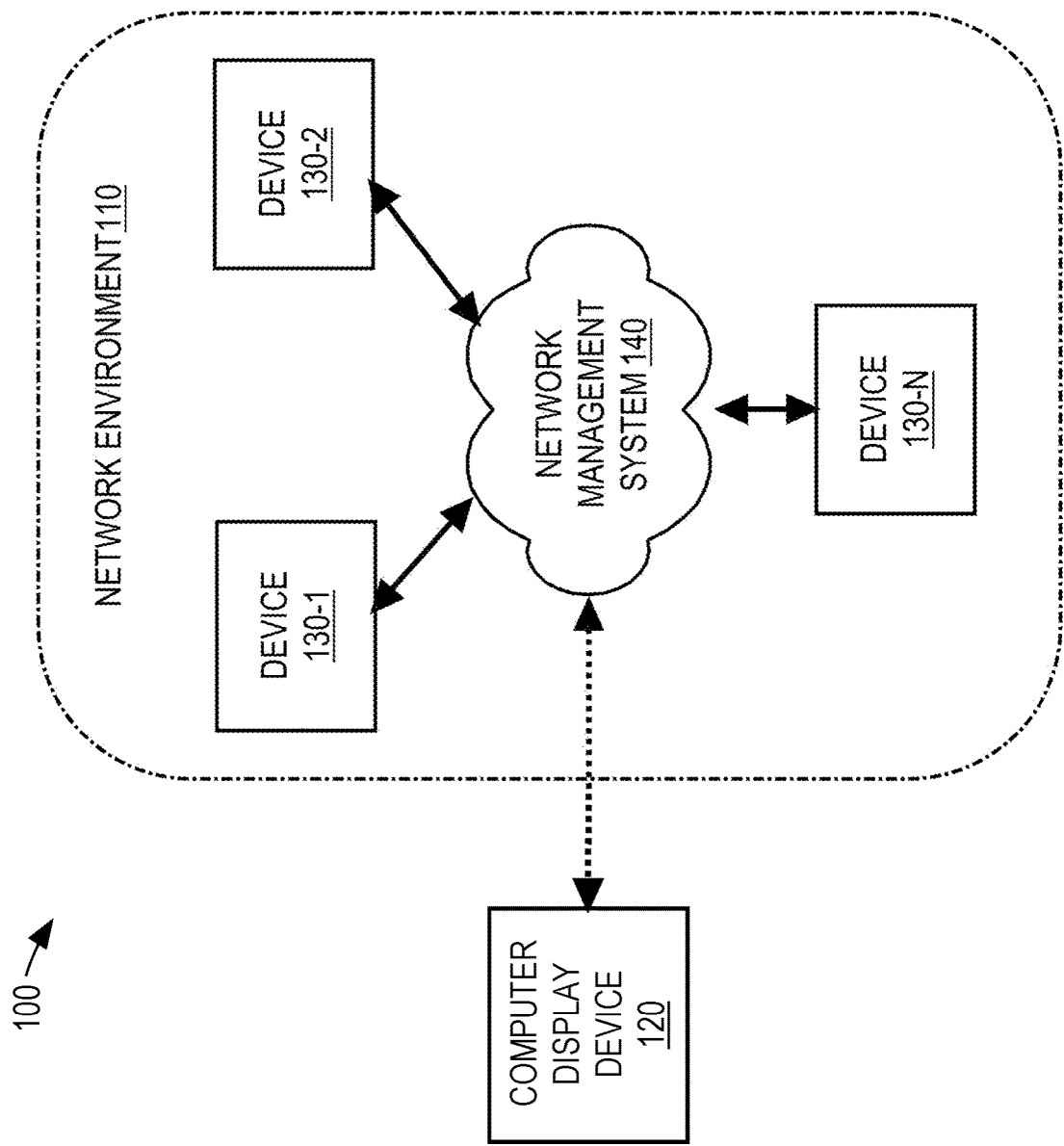
FIG. 1 illustrates a networked environment, according to various embodiments.

FIG. 1 depicts a diagram of a networked environment, in an example embodiment.

In an embodiment, the system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

In an embodiment, system 100 may include network environment 110 and a computer display device 120. Network environment 110 may represent a network of one or more networked devices, such as an enterprise network. Network environment 110 may include devices 130-1, 130-2, and 130-N and network management system 140. Devices 130-1, 130-2, and 130-N may represent a plurality of computers that are configured to provide the functions and operations related to network communication within the network environment 110. FIG. 1 depicts only one of many possible arrangements of components configured to execute the programming described herein. Other arrangements may include additional, fewer, or different components than currently depicted in FIG. 1.

In an embodiment, network management system 140 may represent a central entity such as a server computer system and may be implemented using a server-class computer or other computers having one or more processor cores, co-processors, or other computers. The network management system 140 may be a physical server computer and/or a virtual server instance stored in a data center, such as through cloud computing. The network management system 140 may implement one or more computer programs configured to provide network management of devices within network environment 110. Network management may include, but is not limited to, functions for performance monitoring of elements within network topologies, notification handling, configuration of data paths, configuration of new and/or existing devices, and any other activities related to the network environment 110.

In an embodiment, the computer display device 120 may represent a computer communicatively coupled to the network management system 140 for the purpose of providing an interactive graphical user interface (GUI) to users to operate computer programs implemented by the network management system 140. For example, the computer display device 120 may be a laptop, tablet, or other computer that may be used to log into the computer programs implemented by the network management system 140.

Figure 2A:
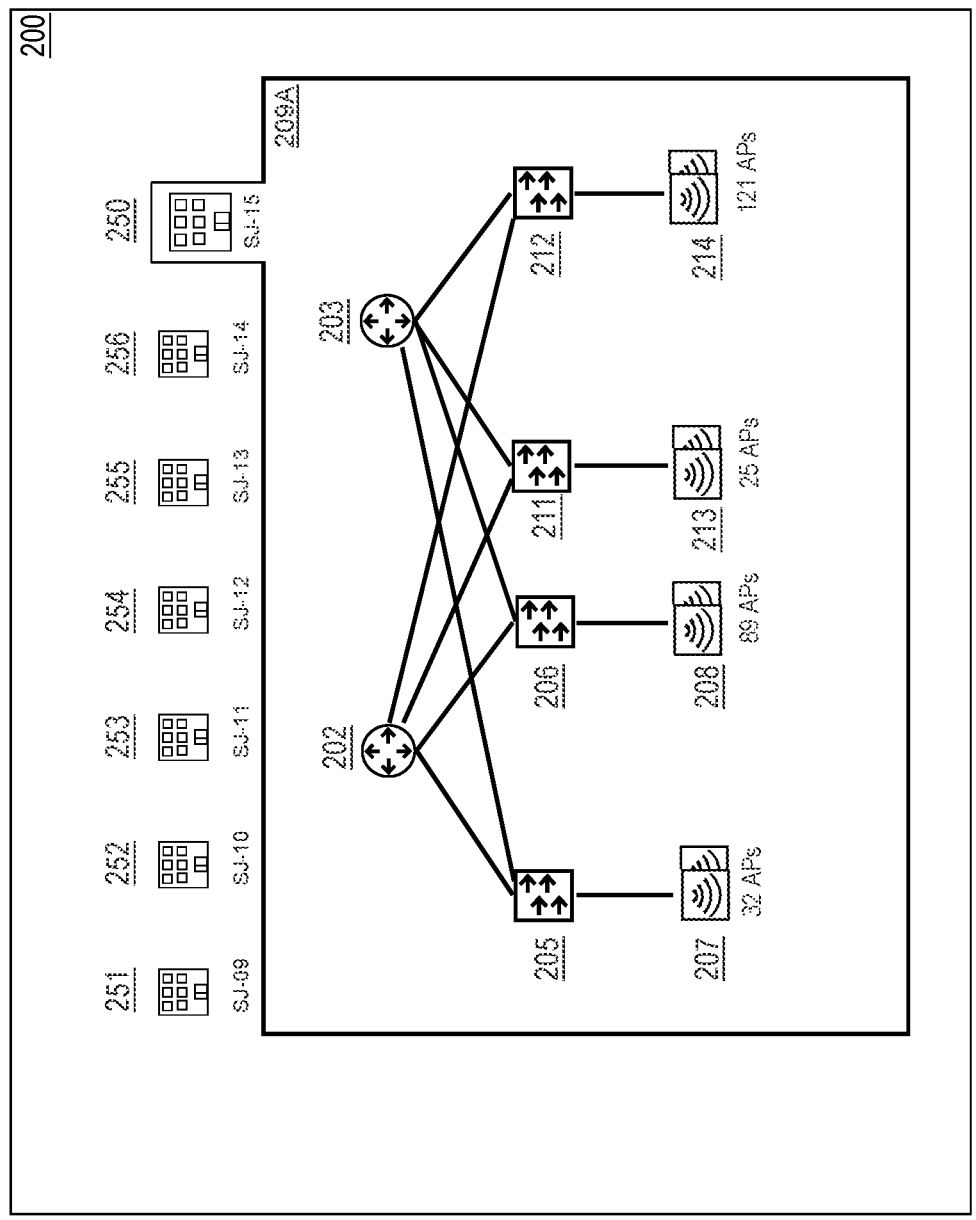
FIG. 2A illustrates an example computer-generated graphical user interface for presenting a visual representation of a network topology map, according to various embodiments.

In an embodiment, network management system 140 may provide an interactive GUI that displays a visual representation of a network topology map to the computer display device 120. FIG. 2A illustrates an example computer-generated graphical user interface for presenting a visual representation of the network topology map. In an embodiment, GUI 200 may comprise a plurality of nodes representing sites 250, 251, 252, 253, 254, 255, and 256. Each of the sites 250-256 may represent a building site, a campus site, a specific floor, or any other area designated as a site containing local area networks, wide area networks, internetworks, or internets belonging to network environment 110.

In an embodiment, tab 209A displays one or more nodes 202, 203, 205, 206, 211, and 212 and aggregate nodes 207, 208, 213, and 214 associated with physical site 250. Physical site 250 may represent building SJ-15 and each of the nodes 202-208 may represent either an internetworking device, such as a router, switch, server, or access point, or a group of internetworking devices. For example, node 202 may represent a device such as a router. Aggregate node 207 may represent an aggregated group of devices such as access points. In an embodiment, a plurality of data links representing a physical connection between two or more internetworking devices represented by nodes 202-214 may be displayed as a solid line or double lines between two nodes. For example, a solid line connecting node 202 to node 205 may represent a physical connection between node 202 (router) to node 205 (switch). In another example (not shown), a double line may be used to represent links between node 205 and aggregate node 207, where node 207 represents a group of access points, may represent physical connections between node 205 and each of the access points represented by aggregate node 207. Double lines between nodes may be used to represent links between a node and a group of nodes represented by an aggregated node. In yet other embodiments, links between a node and a group of nodes may be represented by a bolded line, a colored line, dotted line, or any other modified line that may be distinguishable from a single node to single node link. In an embodiment, each of the remaining physical sites 251-256 in GUI 200 may be selectable and upon selection, a new popup layer may be presented that displays nodes representing a plurality of internetworking devices within the physical site selected.

Figure 2B:
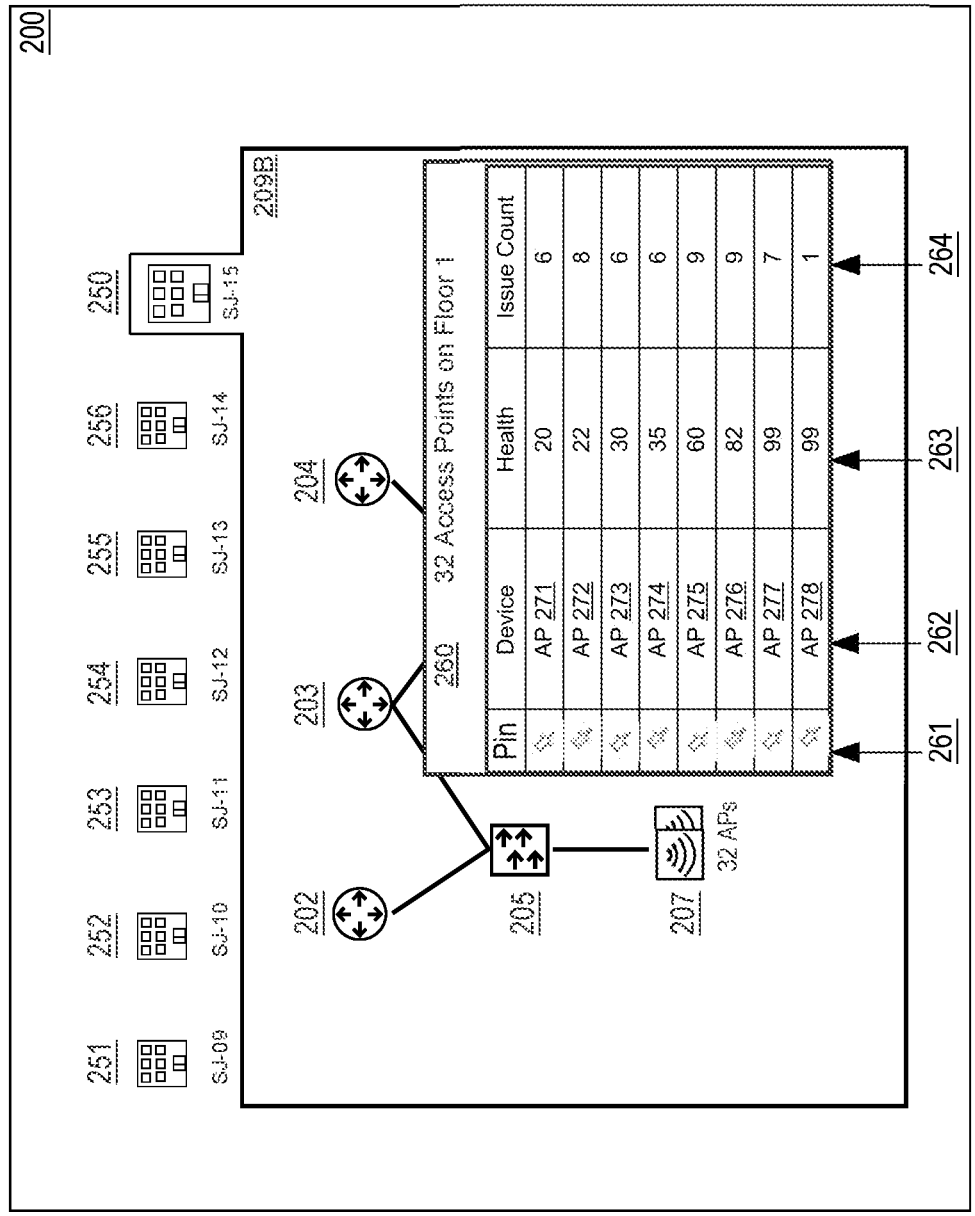
FIG. 2B illustrates an example computer-generated graphical user interface displaying an expanded view of devices represented by a selected aggregated node, according to various embodiments.

In an embodiment, the network management system 140 may display, within the interactive GUI, an expanded view of devices represented by a selected aggregated node. FIG. 2B depicts an example illustration of the GUI displaying the expanded view of devices represented by a selected aggregate node. Within GUI 200, the network management system 140 may display expanded view 260 as a popup window, sidebar window, or an embedded window. Expanded view 260 may include a table of the devices represented by aggregate node 207. The table of devices may display device properties for each device including, but not limited to, a pin that defines whether or not the device is represented by a separate node within the network topology map, a device identifier, a calculated health metric, an issue count, and any other device specific properties related to the current availability and connectivity status of the device.

In an embodiment, column 261 may represent pin statuses for devices, where an enabled pin status represents that a particular device is currently represented as a separate node within the network topology map. An enabled pin status may be graphically represented as a filled in pin icon. A disabled pin status may represent that the particular device is represented by the aggregate node 207 and is not currently represented by a separate node within the network topology map. The disabled pin status may be graphically represented as an outline of the pin icon.

In an embodiment, column 262 may represent device names for the devices. For example, the first row in the expanded view contains AP 271, which represents a device identified as access point 271. In an embodiment, column 263 may represent a device health value for the devices that indicates the current health of the device. FIG. 2B depicts the device health values as a number between 0-100, where 0 equals unhealthy and 100 equals healthy. The device health values may represent a calculated value based upon one or more device metrics related to the number to logged errors, dropped packets, or any other device metric that may be used to determine whether a device is operating within a configured service level agreement. In another embodiment, the device health values may be represented using a graphical indicator such as a colored circle icon where different colors represent different health values. For example, a green circle may indicate a healthy device, a yellow circle may indicate a less healthy device that is still operable, and a red circle may indicate an unhealthy device. In an embodiment, column 264 may represent the currently identified errors that need attention. For example, column 264 indicates that AP 271 has 6 outstanding errors that need attention. Errors may include connection errors, data packet errors, or any other errors or warnings identified by AP 271 or identified by another device related to AP 271.

Expanded view 260 may contain additional columns not depicted in FIG. 2B. In an embodiment, the table within the expanded view 260 may contain columns depicting the current link status of the devices, such as an uplink and a downlink status value. The uplink status column may indicate whether the connection between the device and a core device is operating. For example, if the device is an access point, then the uplink status may indicate whether the port connecting the access point to a switch is currently active. If the port to the switch in not active then the uplink status may indicate inoperability using a red circle, or a low value score. The downlink status column may indicate whether the connection between the device and an endpoint device is operating. For instance, if the device is an access point, then the downlink status may indicate whether the connection between the access point and the endpoint device, such as a laptop, is active. If the connection between the access point and the endpoint device is active then the downlink status may indicate the active status with a green circle, or a high value score.

In an embodiment, the devices displayed within the expanded view 260 may be sorted based upon one or more values within the one or more columns displayed. For example, the network management system 140 may display the list of devices within the expanded view 260 in ascending order of the health metric. For example, the least healthy devices may be displayed at the top of the list. By doing so, a user viewing the expanded view 260 of devices is able to easily identify devices that may need to be monitored. In other examples, the devices within the expanded view 260 may be sorted using different property values in either ascending or descending order. GUI 200, provided by the network management system 140, may allow a user, such as an administrator, to configure the display order of the devices represented by the aggregate node based upon any of the measured property values of the devices.

Figure 2C:
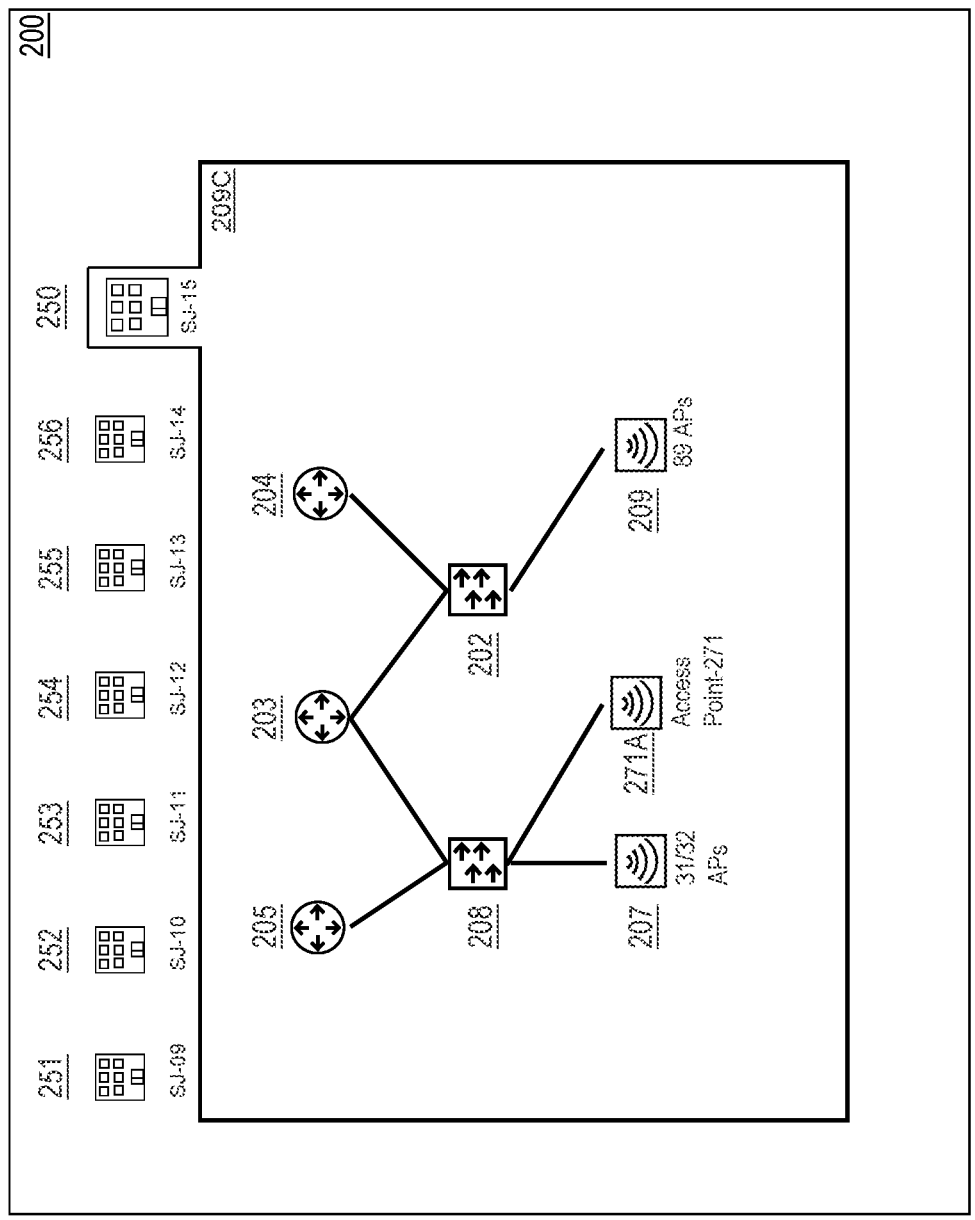
FIG. 2C illustrates an example computer-generated graphical user interface presenting a visual representation of an updated network topology map within the graphical user interface provided by the network management system, according to various embodiments.

FIG. 2C depicts an example illustration of an updated network topology map within the graphical user interface provided by the network management system 140. Node 271A represents a first device node and is associated with a first device (AP 271) selected from a list of devices displayed within expanded view 260. Node 271A is depicted with an access point icon and the device name of "AP 271" is displayed directly under the access point icon.

Figure 2D:
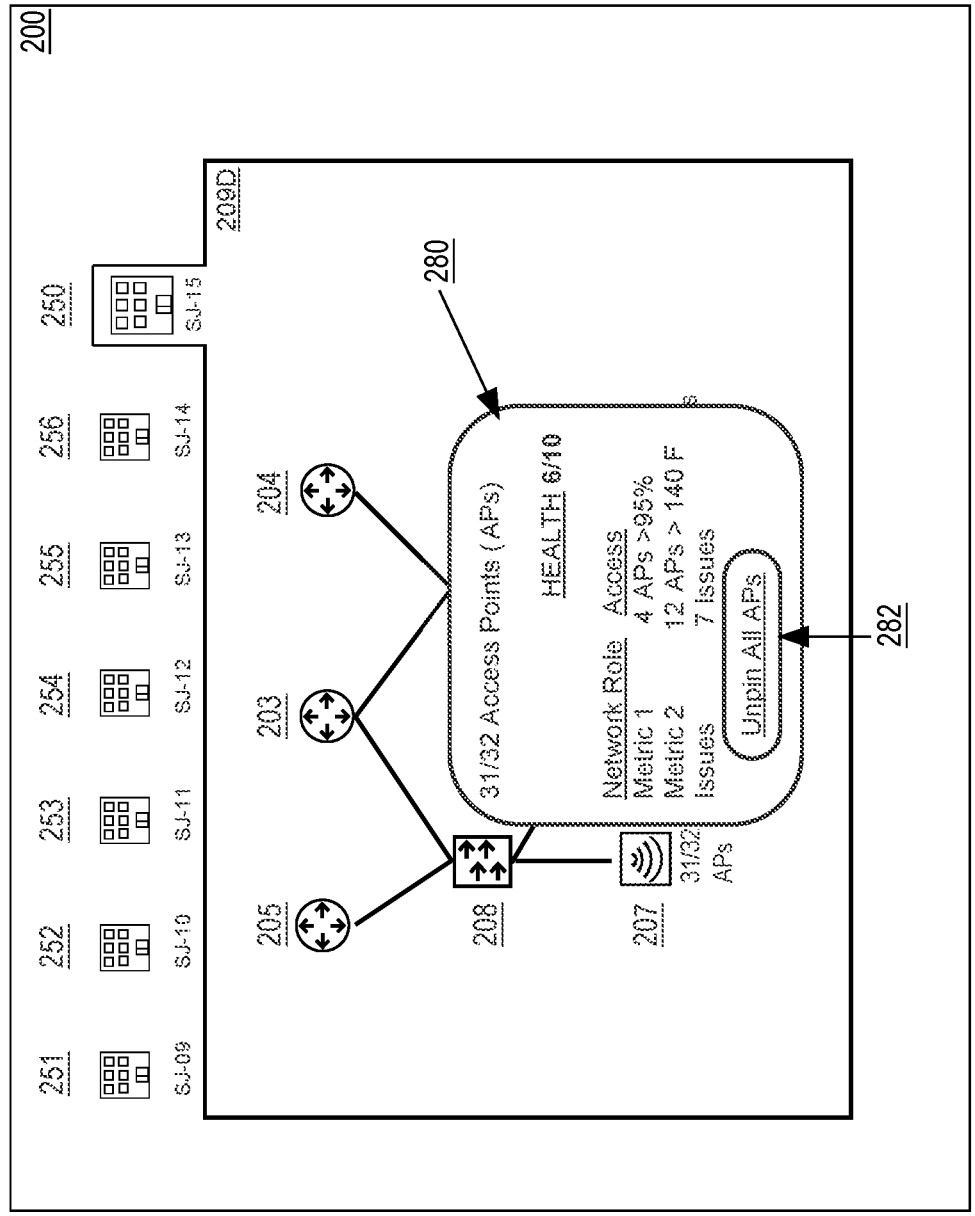
FIG. 2D illustrates an example computer-generated graphical user interface displaying a summary window of aggregated device information for devices represented by an aggregated node, according to various embodiments.

FIG. 2D depicts an example illustration of the GUI displaying a summary window of aggregated device information for devices represented by an aggregated node. Summary window 280 depicts an example summary window containing aggregated device property information for access point devices currently represented by aggregated node 207. The summary window 280 indicates that 31 of 32 access point devices are currently represented by the aggregated node 207 and the summary information provided within the summary window 280 represents an aggregate summary of the 31 access point devices. The summary window 280 may be configured to display an average health score that is based upon the individual health scores for each of the represented access point devices. For example, the summary window 280 displays an average health score of 6/10. In other examples, the summary window 280 may display the average health score as a graphical icon using different colors to indicate the average health score, such as red for poor health, yellow for moderately poor health, and green for good health. In yet other examples, the average health score may be displayed as a combination of displaying a numerical value as well and displaying color coding.

The summary window 280 depicted in FIG. 2D shows aggregated metrics related to network access, device temperature, overall issue count, and any other type of aggregated device metrics. For example, summary window 280 displays a first metric indicating that four access point devices have network access that is greater than 95% uptime. In another example, summary window 280 displays a second metric indicating that 12 access point devices have a device temperature that is greater than 140° C. In yet another example, the summary window displays the total number of issues detected on the access point devices represented by aggregated node 207. Alternative examples of displaying the issues metric may include displaying an average issue count for the access point devices or displaying a total number of critical issues across the represented access point devices.

In an embodiment, summary window 280 may include button 282, which when selected may unpin each device that is currently represented by a separate node within the network topology map. If button 282 is selected, then the network management system 140 may remove any nodes, currently representing devices that were previously represented by aggregated node 207, from the displayed GUI. For instance referring to FIG. 2C, node 271A represents AP 271, which was previously represented by aggregated node 207. Upon selecting button 282, node 271A may be removed from the displayed GUI and aggregated node 207 may be updated to include AP 271. The network management system 140 may update the summary information within the summary window 280 to include metrics from AP 271.

3.0 Procedural Overview

FIG. 3 depicts a method of algorithm for presenting a network topology map of a network of devices, receiving input to selectively display a device represented by an aggregated node as a separate node, and generating an updated network topology map that includes the separate node. FIG. 3 is described at the same level of detail that is ordinarily used, by persons of skill in the art to which this disclosure pertains, to communicate among themselves about algorithms, plans, or specifications for other programs in the same technical field. While process 300 shows a plurality of steps for causing display of a network topology map in a graphical user interface, detecting input selecting an aggregated node, displaying an expanded view of the devices represented by the aggregated node, detecting input selecting a device to be separately displayed within the network topology map, and presenting an updated network topology map, the algorithm or method described herein may be performed using any combination of one or more steps of FIG. 3 in any order, unless otherwise specified. In an embodiment, one or more computer programs of the network management system 140 may perform the steps of process 300 depicted in FIG. 3.

3.1 Network Topology Map

At step 305, process 300 presents a network topology map, within a GUI, comprising a plurality of nodes and a plurality of data links. The plurality of nodes may include at least one aggregated node that represents two or more devices. Each data link in the plurality of data links represents a physical connection between devices represented by two or more nodes. In an embodiment, the network management system 140 may present GUI 200, the network topology map, onto the computer display device 120. For example, a user may connect to the network management system 140 using the computer display device 120. Upon connecting to the network management system 140, the network management system 140 may send data corresponding to GUI 200 to the computer display device 120 for display on a display screen of the computer display device 120.

Referring to FIG. 2A the network management system 140 may display, on the computer display device 120, GUI 200 that includes tab 209A. Tab 209 may display nodes 202, 203, 205, 206, 211, and 212 and aggregated nodes 207, 208, 213, and 214 and a plurality of data links representing physical connections between devices represented by nodes 202, 203, 205, 206, 211, and 212 and aggregated nodes 207, 208, 213, and 214. In an embodiment, the network management system 140 may identify multiple devices that should be represented by an aggregate node based upon whether two or more devices have physical connections to the same parent device. For example, a set of access points may be physically connected to node 205. Network management system 140 may generate aggregate node 207 that represents the set of access points that are physically connected to a switch represented by node 205.

Conventional GUI displays may receive a large number of change requests to adjust the viewable area of the conventional GUI because the GUI either displays each device as a single node within the network topology map thereby requiring constant zoom adjustments or the conventional GUI displays only a portion of the network topology map, thereby resulting in a large number of requests to adjust the viewable area of the network topology map within the conventional GUI. GUI 200 may be more easily readable to a user than conventional GUI representations because GUI 200 is configured to display aggregate nodes and the physical connection information for each of the multiple devices represented by the aggregate nodes without unnecessarily cluttering the GUI with nodes representing each device within the topology map.

In an embodiment, grouping devices together for representation by an aggregated node may be based on several different property attributes of the devices grouped together. For example, devices may be grouped together based on direct physical connections to another device, as depicted by the data link between aggregate node 207 and node 205. In another example, devices may be grouped together based upon have the same device type and having direct physical connections to another device. For instance, all access point devices physically connected to the switch represented by node 205 may be grouped together and represented by an aggregate node. Additionally, all switches physically connected to a node may be grouped together and represented by another aggregate node.

Examples of aggregate nodes are not limited to the aggregate nodes 207 and 208 depicted in FIG. 2A. Aggregate nodes may represent a group of routers, switches, hubs, or any other type of device within the network topology map. For instance, node 205 may be an aggregate node that represents multiple switches that have physical connections to devices represented by nodes 202 and 203. If node 205 represents an aggregate node of multiple switches, then the data link between node 205 and aggregate node 207 may represent each physical connection between the devices represented by node 205 and the devices represented by aggregate node 207.

Referring back to FIG. 3, at step 310 process 300 detects a selection of a first aggregate node of the plurality of nodes displayed within the GUI. In an embodiment, the network management system 140 detects, via user input from the computer display device 120, input of a selection of the first aggregate node within tab 209A. For example, the network management system 140 may detect a selection of aggregate node 207 from tab 209A.

3.2 View of Devices Represented by an Aggregated Node

At step 315, process 300 causes presentation of an expanded view comprising a list of the two or more devices represented by the first aggregate node. In an embodiment, the network management system 140, in response to detecting the selection of the first aggregated node, may present an expanded view, within GUI 200, of a list of the devices represented by the first aggregated node. Referring to FIG. 2B, the network management system 140 may display expanded view 260 as a popup window, sidebar window, or an embedded window. Expanded view 260 may include a table of the devices represented by aggregate node 207. The table may include columns 261, 262, 263, and 264 that may represent pin statuses for devices, device names, device health values, and identified errors that need attention respectively. Other embodiments of the expanded view 260 may include additional columns that depict current link status of the devices, such as uplink and downlink status values.

At step 320 process 300 detects a selection of a first device of the two or more devices. In an embodiment, the network management system 140 detects, via input from the computer display device 120, input of a selection of the first device from the list of devices displayed in the expanded view 260. For example, in FIG. 2B, the network management system 140 may detect input that selects AP 271. The selection may be user input that toggles the pin icon associated with AP 271 from column 261. The selection is not limited to user input that toggles the pin icon. A selection of AP 271 may be detected when user input selects other property values associated with AP 271, such as selecting the device name, the health indicator, or any other property associated with the desired device.

3.3 Updating the Network Topology Map

At step 325, process 300 presents an updated network topology map comprising the plurality of nodes, including the first aggregated node, the plurality of data links, and a first device node that represents the first device. The first aggregated node that is displayed represents the remaining two or more devices other than the first device. In an embodiment, the network management system 140, in response to detecting the selection of the first device, may generate a first device node to represent the first device selected, determine coordinates for inserting the first device node into the network topology map, determine adjusted coordinates for one or more existing nodes, and present the updated network topology map for display on the computer display device 120.

The network management system 140 may generate a first device node that is graphically displayed as a node icon. The node icon may correspond to the device type of the first device selected. For example, if the first device selected is an access point, then the network management system 140 may generate an access point node icon to represent the first device node in the network topology map. In other examples, if the first device selected is a switch, hub, router, or server, then the network management system 140 may generate a node icon that corresponds to the device type of the selected device.

The first device node generated by the network management system 140 may be associated with the first device selected such that device properties may be displayed with the first device node. Referring to FIG. 2C, node 271A represents the first device node and is associated with AP 271. Node 271A is depicted with an access point icon and the device name of "AP 271" is displayed directly under the access point icon.

In an embodiment, the network management system 140, after generating the first device node (node 271A), may determine location coordinates for displaying the first device node within the network topology map. The network management system 140 may be configured to place node 271A at a location that is adjacent to the aggregated node 207. In an embodiment, the network management system 140 may determine the current coordinates of the aggregated node 207 and then determine coordinates for a position directly adjacent to the coordinates of the aggregated node 207. For example, the network management system 140 may determine that node 207 is located at a position (x, y). The network management system 140 may then select a position for node 271A that is immediately to the right of position (x, y), such as position (x+1, y). In another example, the network management system 140 may select a position for node 271A that is immediately to the left of position (x, y), such as position (x−1, y). By selecting a position for node 271A that is immediately next to aggregated node 207, the network management system 140 may generate a data link between node 271A and node 205 that is clearly identifiable to a user viewing the network topology map on the computer display device 120.

If the position selected for node 271A is currently occupied by an existing node, then the network management system 140 may shift the existing node in order to accommodate node 271A. For example, the network management system 140 may identify node 208 as having coordinates corresponding to the position designated for node 271A. The network management system 140 may then adjust the current position of aggregated node 208 by shifting the position of aggregated node 208 to the right in order to accommodate node 271A. If there are additional nodes to the right of aggregated node 208, then the network management system 140 may identify a subset of nodes within the network topology map that need positional adjustment in order to accommodate node 271A. After repositioning the subset of identified nodes, the network management system 140 may generate an updated network topology map for display on the computer display device 120. Tab 209C in FIG. 2C reflects the repositioning of aggregated node 208 in order to accommodate placing node 271A next to aggregated node 207.

In an embodiment, generation of the first device node (node 271A) by the network management system 140 may also include updating device links between nodes. In one example, if aggregated node 207 had downstream links to a set of ten devices (represented by an additional aggregated node) and a subset of five devices had physical connections to the first device node (node 271A), then the network management system 140 may generate a new aggregated node that represents the subset of five devices that have a physical connection to node 271A and the additional aggregated node may be updated to represent the remaining devices of the set of ten devices that have physical connections to the remaining devices in aggregated node 207. As a result, when the network management system 140 generates node 271A, the network management system 140 may also generate an additional single node or an aggregated node and device links to the additional nodes that represent devices that have a physical connections to the first device node now represented within the updated network topology.

In an embodiment, generation of the updated network topology map may include updating annotations associated with aggregated node 207. For example, generating node 271A resulted in aggregated node 207 only representing 31 of the 32 access points connected to node 205. The network management system 140 may update the annotation of aggregated node 207 to display "31/32 APs" directly under the node icon for aggregated node 207. The updated annotation may convey to a user that the aggregated node 207 currently represents 31 of the 32 possible access points that are physically connected to node 205.

In an embodiment, the network management system 140 may be configured to detect when an input cursor hovers over a particular node, and in response to detecting the input cursor hovering over the particular node, the network management system 140 may display information specific to the particular node. For example, if the network management system 140 detected the input cursor hovering over node 271A, then the network management system 140 may display a summary window that contains property information specific to device AP 271. The property information may include, but is not limited to, device health, link status for uplinks and down links, issue count, and an assigned role for the device. Additionally, if the node was previously part of an aggregated node, the summary window may include a button to unpin node 271A from the updated topology map. Unpinning node 271A would cause node 271A to be removed from the updated network topology map and aggregated node 207 would be updated to represent each of the 32 access points, including AP 271.

In an embodiment, if the network management system 140 detects the input cursor hovering over an aggregated node, then the network management system 140 may aggregate device property information for the devices represented by the aggregated node and display the aggregated information within a summary window. For example, if the network management system 140 detects, within the displayed GUI, that the input cursor is hovering over aggregated node 207, then the network management system 140 may generate summary statistics for the devices represented by the aggregated node 207 for display within the summary window. The summary statistics may include, but are not limited to, a current count of the number of devices represented by the aggregated node 207, a total number of issues logged for the devices, a count of the number of devices that have a health value above a specific threshold, and any other device specific properties that may be summed or averaged. Referring to FIG. 2D, summary window 280 illustrates an example summary window containing aggregated device property information for access point devices currently represented by aggregated node 207.

In an embodiment, summary window 280 may include button 282, which when selected may unpin devices currently represented as separate nodes within the network topology map. For instance, AP 271 may currently be represented by node 271A. If button 282 is selected, then the network management system 140 may remove node 271A from the network topology map and may update the set of devices represented by aggregate node 207 to include AP 271. The network management system 140 may update the summary information within the summary window 280 to include metrics from AP 271.

In an embodiment, displayed nodes that represent devices that were previously represented by an aggregated node may be removed and re-aggregated into the set of devices represented by the aggregated node by selecting an option to unpin the device from the displayed node representing the device. Referring to FIG. 2C, the network management system 140 may detect a selection of the node 271A, where the selection indicates a request to remove node 271A from the network topology map. Examples of a selection to remove node 271A may include, but is not limited to, hovering over node 271A to trigger display of a summary popup window and selecting an unpin button from the summary popup window, right clicking on node 271A and selecting a unpin option, selecting an unpin button that may be displayed within GUI 200 and associated with node 271A, or any other option or sequence of clicks that indicates a request to remove node 271A from the network topology map. In response to receiving the request to remove node 271A, the network management system 140 may update the network topology map by removing node 271A and repositioning the remaining nodes displayed within the network topology map. In an embodiment, repositioning the remaining nodes may include shifting a subset of nodes that were adjacent to node 271A over by one position such that one of the nodes in the subset of node shifted is now in the position previously occupied by node 271A. For instance, aggregated node 208 may be shifted to the left by one position to occupy the position previously occupied by node 271A. The network management system 140 may then present the updated network topology map within GUI 200.

In another embodiment, devices previously represented by an aggregated node that are currently displayed within the network topology map, may be unpinned from the network topology map using the pin icons displayed within expanded view 260. The network management system 140 may detect a selection of aggregated node 207, and in response to detecting a selection of aggregated node 207, the network management system 140 may display expanded view 260. Expanded view 260 may include a table of the devices represented by aggregate node 207. Within the table of devices, column 261, which represents pin statuses, may display a solid pin next to devices that are currently represented by a separate node within the network topology map. The network management system 140 may detect a second selection that selects a solid pin in column 261 from expanded view 260. The second selection may indicate a request to unpin the displayed node for the associated device from the network topology map. The network management system 140 may remove the displayed node from the network topology map, reposition any adjacent nodes within the network topology map, and display an updated network topology map where aggregated node 207 represents a set of devices that includes the recently unpinned device. Upon unpinning the associated device, the pin icon within column 261 may be displayed using an outline of the pin icon to represent that the device is not currently displayed using a separate node.

The techniques that have been described address the technical problem of how to monitor one or more devices from a group of devices represented by a single aggregated node within a graphical user interface, without unnecessarily cluttering the graphical user interface with nodes representing each of the devices. The techniques that have been described offer numerous improvements over prior practice. For example, the embodiments described implement an improved graphical user interface that allows specific devices, which are part a group of devices that are displayed as an aggregated node, to be selected for individual display within a network topology map without disaggregating each of the other devices, of the group of devices, that make up the aggregated node. By allowing specific devices from a group of devices aggregated to be selectively displayed within a network topology map, the display of nodes within the network topology map may be more easily readable by a user without the need of providing unnecessary input to change the view of the network topology map in order to display information related to specific devices. The network topology map may display specific devices that may need additional monitoring as well as aggregated nodes that represent the group of remaining devices within a single view. The improved graphical user interface provides a single interface view that allows a user to monitor a group of devices represented by the aggregated node as well as specific devices represented by individual nodes. Additionally, the improved graphical user interface may be used for improved troubleshooting of devices by allowing the user to customize display of individual devices and customized groups of devices. For example, problematic devices may be individually displayed in the network topology map for troubleshooting and sets of other devices may be grouped together and represented with a custom aggregated node in order to allow a user to efficiently troubleshoot critical network paths. The improved graphical user interface may result in reducing network bandwidth and computing resources associated with generating and transmitting view changes to network topology map that are associated with conventional network topology displays.

4.0 Implementation Mechanisms—Hardware Overview

According to one embodiment, the techniques described herein are implemented by at least one computing device.

The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
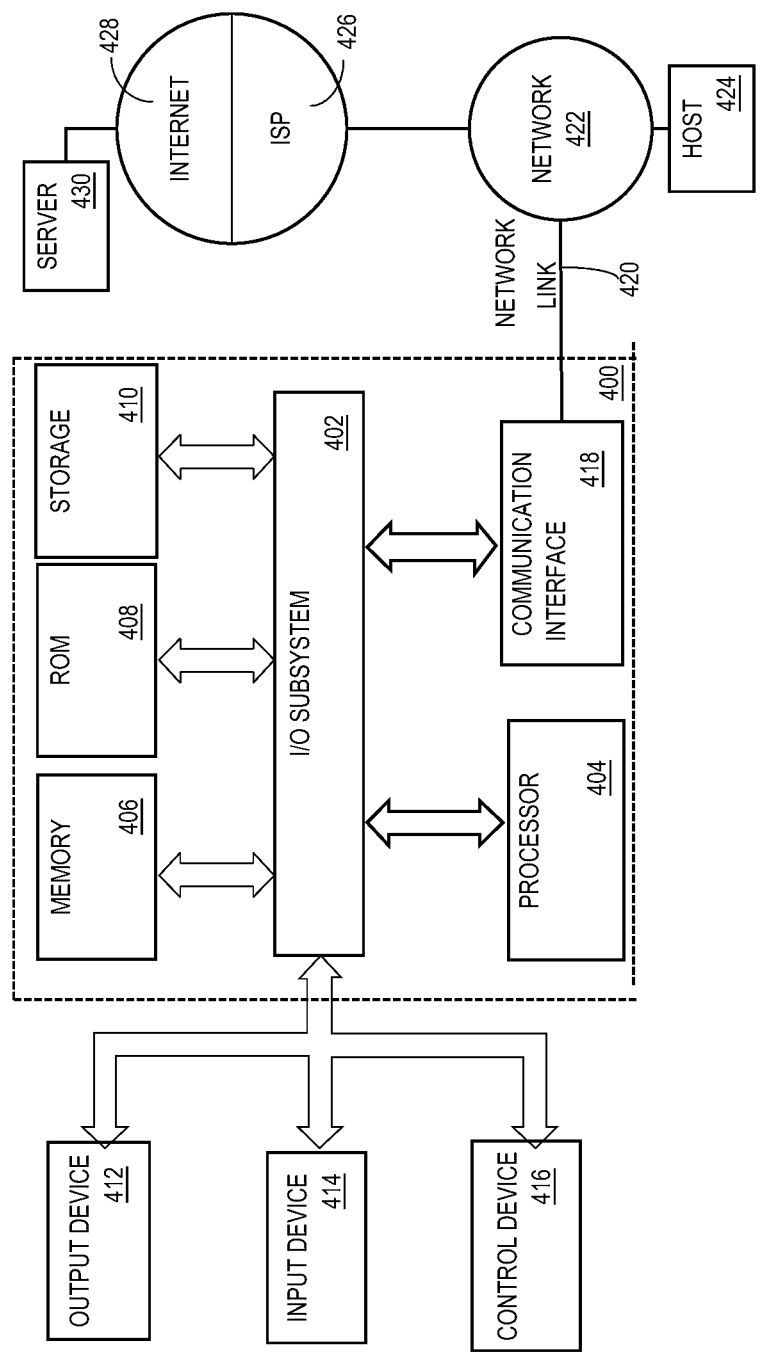
FIG. 4 illustrates a computer system upon which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5.0 Benefits, Improvements, Extensions And Alternatives

Embodiments provide the technical benefits of reducing network bandwidth and computing resources associated with generating and transmitting an interactive graphical user interface to a computer display device. Embodiments described implement an improved graphical user interface that allows specific devices, which are part a group of devices that are displayed as an aggregated node, to be selected for individual display within a network topology map without disaggregating each of the devices, of the group of devices, that make up the aggregated node. By allowing specific devices from a group of devices aggregated to be selectively displayed within a network topology map, the display of nodes within the network topology map may be more easily readable by a user without the need of providing unnecessary input to change the view of the network topology map in order to display information related to specific devices. The network topology map may display specific devices that may need additional monitoring as well as aggregated nodes that represent the group of remaining devices within a single view. Thereby further reducing network bandwidth and computing resources associated with inputs to change the current view of the network topology map displayed.

Based on the foregoing, it will be apparent that the disclosure as a whole is directed to improvements in displaying network topology maps of internetworking technology by providing new and more efficient methods for displaying specific devices and groups of devices within a network topology.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
presenting, in a computer-generated graphical user interface, a network topology map comprising a plurality of nodes and a plurality of data links, the plurality of nodes comprising at least one aggregated node that represents two or more devices of a data communication network, each data link in the plurality of data links representing a physical connection between devices represented by two or more nodes;

detecting a selection of a first aggregated node of the plurality of nodes;

in response to detecting the selection of the first aggregated node, causing presentation of an expanded view comprising a list of the two or more devices of the first aggregated node;

detecting a selection of a first device of the two of more devices;

in response to detecting the selection of the first device, presenting, within the computer-generated graphical user interface, an updated network topology map comprising the plurality of nodes including the first aggregated node, the plurality of data links, and a first device node that represents the first device, the first aggregated node representing remaining devices of the two or more devices other than the first device;

detecting a second selection of the first aggregated node;

in response to detecting the second selection of the first aggregated node, causing presentation of the expanded view comprising the list of the two or more devices, wherein the first device has an associated indicator that indicates that the first device is currently displayed within the updated network topology map;

detecting a third selection of the associated indicator of the first device in the list of the two or more devices; and in response to detecting the third selection of the associated indicator, removing the first device node from the updated network topology map.

2. The computer-implemented method of claim 1, wherein presenting the network topology map comprises:

aggregating the two or more devices to generate the first aggregated node, the aggregation based upon each of the two or more devices having a direct physical connection to a parent node, wherein the parent node represents either of a single device or an aggregated node of multiple devices;

presenting the network topology map comprising the plurality of nodes and the plurality of data links, wherein the first aggregated node is one of the plurality of nodes presented in the network topology map.

3. The computer-implemented method of claim 1, wherein the list of the two or more devices comprises separate rows for each device in the two or more devices, each row comprising at least one of a health status indicator, an uplink status, a downlink status, and a number of reported issues;

wherein the rows of the list are sorted in descending order by the health status indicator with rows having lowest health status indicator values displayed at the top of the list.

4. The computer-implemented method of claim 1, wherein detecting the selection of the first device of the two or more devices comprises detecting the selection of a pin icon associated with the first device.

5. The computer-implemented method of claim 1, wherein presenting the updated network topology map comprises:

updating coordinates of a subset of nodes of the plurality of nodes by shifting the subset of nodes that are adjacent to the aggregated node by one position;

inserting the first device node into the network topology map at coordinates corresponding to a position that is adjacent to the first aggregated node;

presenting the updated network topology map that includes the first device node and the plurality of nodes in positions corresponding to their coordinates.

6. The computer-implemented method of claim 1, further comprising:

detecting that current coordinates of an input cursor overlap coordinates of the first aggregated node;

in response to detecting that the current coordinates of the input cursor overlap coordinates of the first aggregated node, displaying a summary view of the first aggregated node, the summary view comprising aggregated performance metrics for each of the two or more devices not currently displayed within the updated network topology map.

7. The computer-implemented method of claim 1, further comprising:

detecting a second selection of the first device node from the updated network topology map, wherein the second selection indicates removing the first device node from the updated network topology map;

in response to detecting the second selection of the first device node from the updated network topology map, removing the first device node from the updated network topology map; and updating coordinates of a subset of nodes of the plurality of nodes by shifting the subset of nodes that were adjacent to the first device node by one position;

presenting the updated network topology map of the plurality of nodes in positions corresponding to their coordinates.

8. A computer system comprising:

one or more processors;

one or more stored sequences of instructions which, when executed by the one or more processors, cause:

presenting, in a computer-generated graphical user interface, a network topology map comprising a plurality of nodes and a plurality of data links, the plurality of nodes comprising at least one aggregated node that represents two or more devices of a data communication network, each data link in the plurality of data links representing a physical connection between devices represented by two or more nodes;

detecting a selection of a first aggregated node of the plurality of nodes;

in response to detecting the selection of the first aggregated node, causing presentation of an expanded view comprising a list of the two or more devices of the first aggregated node;

detecting a selection of a first device of the two of more devices;

in response to detecting the selection of the first device, presenting, within the computer-generated graphical user interface, an updated network topology map comprising the plurality of nodes including the first aggregated node, the plurality of data links, and a first device node that represents the first device, the first aggregated node representing remaining devices of the two or more devices other than the first device;

detecting a second selection of the first aggregated node;

in response to detecting the second selection of the first aggregated node, causing presentation of the expanded view comprising the list of the two or more devices, wherein the first device has an associated indicator that indicates that the first device is currently displayed within the updated network topology map;

detecting a third selection of the associated indicator of the first device in the list of the two or more devices;

in response to detecting the third selection of the associated indicator, removing the first device node from the updated network topology map.

9. The computer system of claim 8, wherein presenting the network topology map comprises:

aggregating the two or more devices to generate the first aggregated node, the aggregation based upon each of the two or more devices having a direct physical connection to a parent node, wherein the parent node represents either of a single device or an aggregated node of multiple devices;

presenting the network topology map comprising the plurality of nodes and the plurality of data links, wherein the first aggregated node is one of the plurality of nodes presented in the network topology map.

10. The computer system of claim 8, wherein the list of the two or more devices comprises separate rows for each device in the two or more devices, each row comprising at least one of a health status indicator, an uplink status, a downlink status, and a number of reported issues;

wherein the rows of the list are sorted in descending order by the health status indicator with rows having lowest health status indicator values displayed at the top of the list.

11. The computer system of claim 8, wherein detecting the selection of the first device of the two or more devices comprises detecting the selection of a pin icon associated with the first device.

12. The computer system of claim 8, wherein presenting the updated network topology map comprises:

updating coordinates of a subset of nodes of the plurality of nodes by shifting the subset of nodes that are adjacent to the aggregated node by one position;

inserting the first device node into the network topology map at coordinates corresponding to a position that is adjacent to the first aggregated node;

presenting the updated network topology map that includes the first device node and the plurality of nodes in positions corresponding to their coordinates.

13. The computer system of claim 8, further comprising sequences of instructions which, when executed by the one or more processors, cause:

detecting that current coordinates of an input cursor overlap coordinates of the first aggregated node;

in response to detecting that the current coordinates of the input cursor overlap coordinates of the first aggregated node, displaying a summary view of the first aggregated node, the summary view comprising aggregated performance metrics for each of the two or more devices not currently displayed within the updated network topology map.

14. The computer system of claim 8, further comprising sequences of instructions which, when executed by the one or more processors, cause:

detecting a second selection of the first device node from the updated network topology map, wherein the second selection indicates removing the first device node from the updated network topology map;

in response to detecting the second selection of the first device node from the updated network topology map, removing the first device node from the updated network topology map; and updating coordinates of a subset of nodes of the plurality of nodes by shifting the subset of nodes that were adjacent to the first device node by one position;

presenting the updated network topology map of the plurality of nodes in positions corresponding to their coordinates.

15. A non-transitory computer-readable storage medium comprising one or more sequences of instructions which, when executed by one or more processors, cause the one or more processors to perform the steps of:

presenting, in a computer-generated graphical user interface, a network topology map comprising a plurality of nodes and a plurality of data links, the plurality of nodes comprising at least one aggregated node that represents two or more devices of a data communication network, each data link in the plurality of data links representing a physical connection between devices represented by two or more nodes;

detecting a selection of a first aggregated node of the plurality of nodes;

in response to detecting the selection of the first aggregated node, causing presentation of an expanded view comprising a list of the two or more devices of the first aggregated node;

detecting a selection of a first device of the two of more devices;

in response to detecting the selection of the first device, presenting, within the computer-generated graphical user interface, an updated network topology map comprising the plurality of nodes including the first aggregated node, the plurality of data links, and a first device node that represents the first device, the first aggregated node representing remaining devices of the two or more devices other than the first device;

detecting a second selection of the first aggregated node;

in response to detecting the second selection of the first aggregated node, causing presentation of the expanded view comprising the list of the two or more devices, wherein the first device has an associated indicator that indicates that the first device is currently displayed within the updated network topology map;

detecting a third selection of the associated indicator of the first device in the list of the two or more devices; and in response to detecting the third selection of the associated indicator, removing the first device node from the updated network topology map.

16. The non-transitory computer-readable storage medium of claim 15, wherein presenting the network topology map comprises:

aggregating the two or more devices to generate the first aggregated node, the aggregation based upon each of the two or more devices having a direct physical connection to a parent node, wherein the parent node represents either of a single device or an aggregated node of multiple devices;

presenting the network topology map comprising the plurality of nodes and the plurality of data links, wherein the first aggregated node is one of the plurality of nodes presented in the network topology map.

17. The non-transitory computer-readable storage medium of claim 15, wherein the list of the two or more devices comprises separate rows for each device in the two or more devices, each row comprising at least one of a health status indicator, an uplink status, a downlink status, and a number of reported issues;

wherein the rows of the list are sorted in descending order by the health status indicator with rows having lowest health status indicator values displayed at the top of the list.

18. The non-transitory computer-readable storage medium of claim 15, wherein detecting the selection of the first device of the two or more devices comprises detecting the selection of a pin icon associated with the first device.

19. The non-transitory computer-readable storage medium of claim 15, wherein presenting the updated network topology map comprises:

updating coordinates of a subset of nodes of the plurality of nodes by shifting the subset of nodes that are adjacent to the aggregated node by one position;

inserting the first device node into the network topology map at coordinates corresponding to a position that is adjacent to the first aggregated node;

presenting the updated network topology map that includes the first device node and the plurality of nodes in positions corresponding to their coordinates.

20. The non-transitory computer-readable storage medium of claim 15, further comprising:

detecting that current coordinates of an input cursor overlap coordinates of the first aggregated node;

in response to detecting that the current coordinates of the input cursor overlap coordinates of the first aggregated node, displaying a summary view of the first aggregated node, the summary view comprising aggregated performance metrics for each of the two or more devices not currently displayed within the updated network topology map.

\* \* \* \* \*